(12) United States Patent
Nakagawa et al.

(10) Patent No.: US 7,427,155 B2
(45) Date of Patent: Sep. 23, 2008

(54) LIQUID CRYSTAL MODULE

(75) Inventors: Taiji Nakagawa, Tottori (JP); Seiji Morimoto, Tottori (JP); Yuki Muraoka, Tottori (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 588 days.

(21) Appl. No.: 10/985,996

(22) Filed: Nov. 12, 2004

(65) Prior Publication Data

US 2005/0105013 A1 May 19, 2005

(30) Foreign Application Priority Data

Nov. 14, 2003 (JP) ............... 2003-385363

(51) Int. Cl.
*G02F 1/1333* (2006.01)
*F21V 7/04* (2006.01)

(52) U.S. Cl. ............... 362/634; 362/614; 362/632; 362/390; 349/56; 349/60

(58) Field of Classification Search ............... 362/600, 362/614, 632, 633, 634, 373, 390, 26, 260; 349/56, 58, 60
See application file for complete search history.

(56) References Cited

U.S. PATENT DOCUMENTS 3,358,167 A * 12/1967 Shanks ............... 313/25
6,545,732 B2 * 4/2003 Nakano ............... 349/58
6,808,302 B2 * 10/2004 Miyamoto ............... 362/580
6,839,100 B1 * 1/2005 Saito et al. ............... 349/58
6,966,686 B2 * 11/2005 Chen ............... 362/634
7,086,774 B2 * 8/2006 Katsuda et al. ............... 362/634
2001/0006459 A1 * 7/2001 Okumura ............... 362/31

FOREIGN PATENT DOCUMENTS

JP 10-096900 4/1998
JP 10096900 A * 4/1998
JP 11-258601 9/1999
JP 2006127834 A * 5/2006

* cited by examiner

*Primary Examiner*—Hargobind S. Sawhney
*Assistant Examiner*—David R Crowe
(74) *Attorney, Agent, or Firm*—Katten Muchin Rosenman LLP

(57) ABSTRACT

A liquid crystal module provides for concave shaped recesses formed in an elastic member along the circumference of a linear light source that is arranged on the side of a light guide, and lamp holders attached to both ends of the linear light source, while ring-shaped hard members are engaged with the recesses. Thus, the hard members serve as a grip against an impact applied to the linear light source, and the linear light source is prevented from being damaged. Accordingly, a side-light-type liquid crystal module with a liquid crystal panel is thereby obtained, in which the damage to the linear light source (when an impact, or the like, is applied to the liquid crystal panel) is prevented by simple means without affecting the quality of light that is emitted toward the liquid crystal panel.

3 Claims, 6 Drawing Sheets

LIQUID CRYSTAL MODULE

BACKGROUND OF THE INVENTION

The present invention relates to a liquid crystal module, and more particularly to a liquid crystal module having a liquid crystal panel with a sidelight-type backlight disposed on the rear surface thereof.

In the case of a liquid crystal module that provides a display using light coming from the outside, the backlight is generally located on the rear surface of the liquid crystal panel. In addition, modules using a linear light source (such as a cold cathode fluorescent tube) as a backlight are well-known. The backlight, acting as the linear light source, basically comprises two types, depending on the arrangement method of the linear light source. One type is the so-called direct-type backlight where the linear light source is placed directly under the liquid crystal panel. This type of backlight is mainly employed for a liquid crystal TV set using a large-sized liquid crystal panel requiring high brightness.

The other type of backlight is the so-called sidelight-type backlight where the linear light source is positioned on the side of the light guiding plate that is arranged directly under the liquid crystal panel. The sidelight-type backlight is often employed for the monitor of a personal computer which requires a low-profile, or an in-vehicle monitor, and the like.

One example of the configuration of the sidelight-type backlight is described in Japanese Patent Laid-Open Publication No. 11-258601 (JP, 11-258601, A1), where the light guiding plate (also referred to as the light guide) is located on the rear surface of the liquid crystal panel, and an optical sheet (such as a diffusion plate) is arranged between the liquid crystal panel and the light guide, and a reflector resides on the rear surface of the light guide. In such manner, a lamp serving as the linear light source is arranged on the side of the light guide.

Usually, so-called lamp holders, made of an elastic member such as silicon rubber, are attached on both ends of the linear light source to support it.

The configuration of the structure around the lamp holders supporting the linear light source will hereafter be described in more detail with reference to the cross-sectional view of FIG. 6, which shows an example of the sidelight-type backlight liquid crystal module of the prior art.

Reference numeral 10 represents a liquid crystal panel comprising a pair of transparent substrates, a liquid crystal layer (not shown) formed between the pair of transparent substrates, and polarizers that are adhered to the surface of each such substrate. The liquid crystal layer does not face the substrates. Reference numeral 20 represents the light guide 20 disposed on the rear surface of the liquid crystal panel 10, which is made of acrylic resin and flecked reflective paint or the like printed on the bottom surface thereof. An optical sheet comprising a diffusion sheet 21 and a prism sheet 22 is arranged between the liquid crystal panel 10 and the light guide 20, and a reflector 23 is arranged on the rear surface of the light guide.

Reference numeral 30 represents the linear light source comprising a cold cathode tube, which is arranged on the side of the light guide 20. Lamp holders 40 for supporting and affixing the linear light source 30 are attached on both ends of the linear light source 30 for the purpose of covering a portion of the glass tube of the linear light source and a portion of the lead wires 35 extending from the electrodes and the end portions of the linear light source. Further, the lamp holders 40 are shaped in such manner as to engage with the corner periphery of a case 50 that houses the light guide 20 and the linear light source 30.

Reference numeral 60 represents a horseshoe-shaped lamp house covering the linear light source along the longitudinal direction of the linear light source 30, such that light emitted from the linear light source 30 efficiently strikes the side surface of the light guide 20.

Reference numeral 70 represents an inner frame for supporting and affixing the liquid crystal panel 10. Then, the lead wires 35 leading out from the lamp holders 40 are laid in spaces formed between the case 50, the lamp house 60, and the inner frame 70. Further, a front frame 80, whose cross-section is approximately L-shaped, is arranged so as to cover the periphery of the front end portion of the liquid crystal panel 10.

Because of its ability to provide backlight to portable products, the sidelight-type backlight is often used. Accordingly, further space saving is desired, and a narrow frame is realized by providing a tapered portion on the lamp holder to shorten the distance between the linear light source and the light guide, as described in JP 11-258601 A1, by way of example.

On the other hand, there is a risk that an unexpected impact will be applied to the portable instrument or apparatus during transport. When the distance between the linear light source and the light guide becomes smaller, as described in JP 11-258601 A1, the linear light source may be damaged due to impact when it contacts the light guide. Even if the linear light source and the light guide do not make contact directly, the impact is nevertheless transmitted to the light guide via the thin lamp holders causing damage to the linear light source.

To prevent the linear light source and the light guide from coming into contact with each other, cubic lamp holders, positioned between the linear light source and the light guide (see Japanese Patent Laid-Open No. 10-96900 publication [JP, 10-096900, A1]), are provided near both ends of the linear light source, while in some cases, nails may be provided. However, since the potential contact area between the side surface of the cubic lamp holders and the light guide is very large, light is blocked in an amount corresponding to the contact area, and a large shadow forms on the light guide. In addition, since large quantities of light are blocked when nails are used as well, a large shadow likewise forms on the light guide. Therefore, when such a configuration is employed, the light traveling in the light guide is largely uneven, which consequently results in light of uneven brightness being emitted toward the liquid crystal panel.

SUMMARY OF THE INVENTION

Consequently, it is an object of the present invention to provide a sidelight-type liquid crystal module in which the damage to the linear light source due to impact may be avoided by a simple means without affecting the quality of light that is emitted toward the liquid crystal panel.

One aspect of the present invention aims to solve the above-described problem by providing for a liquid crystal module comprising a liquid crystal panel and a backlight having a light guide, a linear light source arranged on the side of the light guide, and lamp holders attached on both ends of the linear light source, in which the lamp holder has an elastic member and a ring-shaped hard member, and the elastic member is arranged between the linear light source and the ring-shaped hard member.

Another aspect of the present invention refers to the above-described liquid crystal module in which the ring-shaped hard member is attached in such manner as to come into contact with the light guide.

Yet another of the present invention refers to the above-described liquid crystal module in which the ring-shaped hard member is engaged with the recess that is formed on the elastic member along the circumference of the linear light source.

A further aspect of the present invention refers to the above-described liquid crystal module in which the elastic member includes a small diameter portion on one side facing the other lamp holder, and the ring-shaped hard member is engaged with the small diameter portion of the elastic member.

Yet a further aspect of the present invention refers to the above-described liquid crystal module in which the elastic member includes small protrusions at the end portion of the small diameter portion thereof to prevent the ring-shaped hard member from being dislodged.

Another aspect of the present invention refers to the above-described liquid crystal module in which the small protrusions may be disc-shaped, hemispherical or rib-shaped.

Yet another aspect of the present invention refers to the above-described liquid crystal module in which the light guide is rectangular in shape and housed in a case together with the linear light source and the lamp holders, the bottom surface of the case approximately being flat in the space between the light guide and the lamp holders.

A further aspect of the present invention refers to the above-described liquid crystal module in which the ring-shaped hard member is made of metal.

Yet another aspect of the present invention refers to a liquid crystal module comprising a liquid crystal panel, a light guide, a linear light source disposed on the side of the light guide, lamp holders made of an elastic member and attached on both ends of the linear light source, and a case for housing the light guide, the linear light source and the lamp holders, in which a ring-shaped hard member is attached to the lamp holder for fixing the distance between the light guide and the case, and the elastic member is located between the linear light source and the ring-shaped hard member.

Another aspect of the present invention refers to the above-described liquid crystal module in which the ring-shaped hard member is engaged with the recess that is formed on the elastic member along the circumference of the linear light source.

Yet another aspect of the present invention refers to the above-described liquid crystal module in which the elastic member includes a small diameter portion on one side facing the other lamp holder, and the ring-shaped hard member is engaged with the small diameter portion of the elastic member.

A further aspect of the present invention refers to the above-described liquid crystal module in which the elastic member includes small protrusions at the end portion of the small diameter portion thereof to prevent the ring-shaped hard member from being dislodged.

Yet a further aspect of the present invention refers to the above-described liquid crystal module in which the small protrusions may be disc-shaped, hemispherical or rib-shaped.

Another aspect of the present invention refers to the above-described liquid crystal module in which the light guide is rectangular in shape, and the bottom surface of the case is relatively flat in the space between the light guide and the lamp holder.

Yet another aspect of the present invention refers to the above-described liquid crystal module in which the ring-shaped hard member is made of metal.

Another aspect of the present invention refers to a liquid crystal module comprising a liquid crystal panel, a light guide, a linear light source disposed on the side of the light guide, lamp holders made of an elastic member and attached on both ends of the linear light source, and a case for housing the light guide, the linear light source and the lamp holders, to which a ring-shaped hard member is attached via an elastic member located between the holder and the linear light source, the ring-shaped hard member pressing against the light guide into contact.

Yet another aspect of the present invention refers to the above-described liquid crystal module in which the ring-shaped hard member is engaged with the elastic member.

A further aspect of the present invention refers to the above-described liquid crystal module in which the elastic member is provided with small protrusions for preventing the ring-shaped hard member from coming off on a part of the end portion thereof.

Yet a further aspect of the present invention refers to the above-described liquid crystal module in which the small protrusions may be disc-shaped, hemispherical or rib-shaped.

Another aspect of the present invention refers to the above-described liquid crystal module in which the ring-shaped hard member is made of metal.

BRIEF DESCRIPTION OF THE DRAWINGS

FIG. 2A is a plane view of the principal portion of the liquid crystal module representing the FIG. 1 embodiment of the present invention, while

PREFERRED EMBODIMENTS OF THE INVENTION

The best modes for carrying out the present invention will hereafter be described in detail with reference to the embodiments and the drawings. The embodiments as discussed below are not intended in any manner to limit the scope of the present invention.

Figure 1:
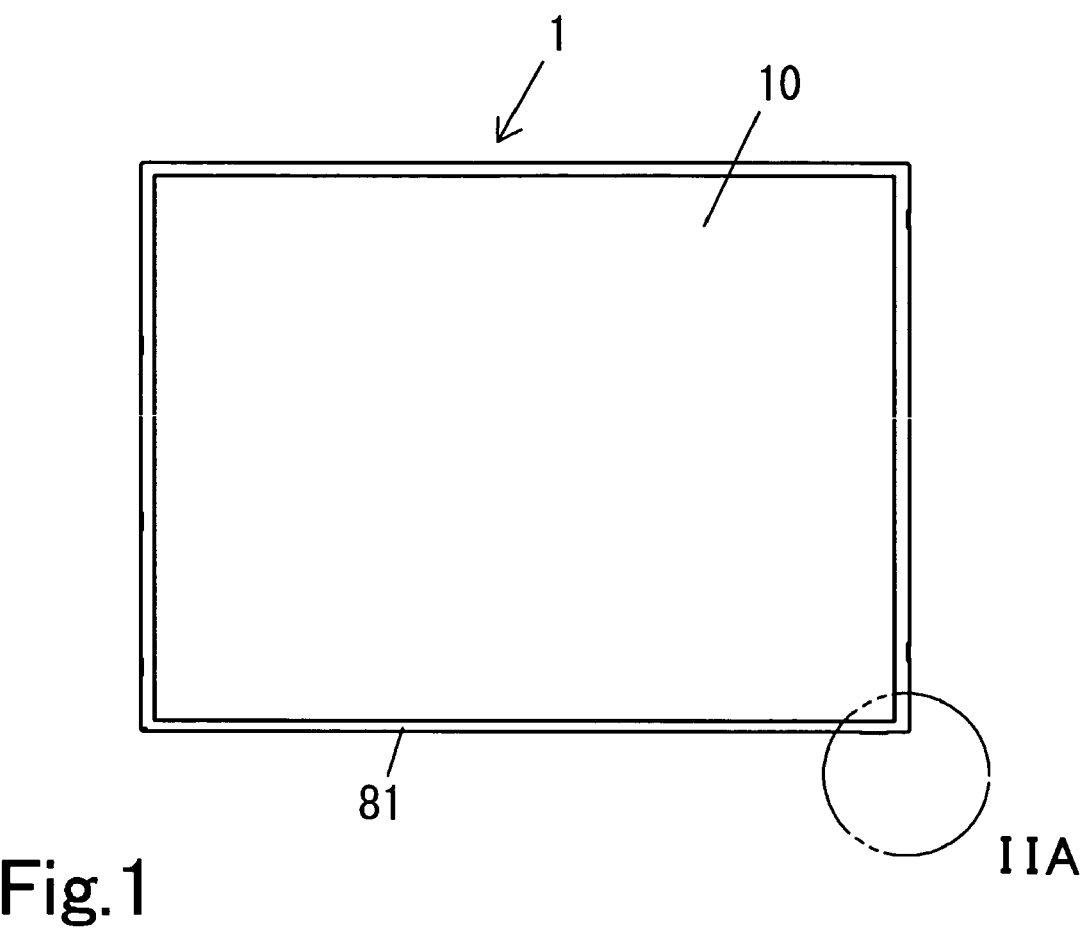
FIG. 1 is a front view of a liquid crystal module representing an embodiment of the present invention.
Figure 2:
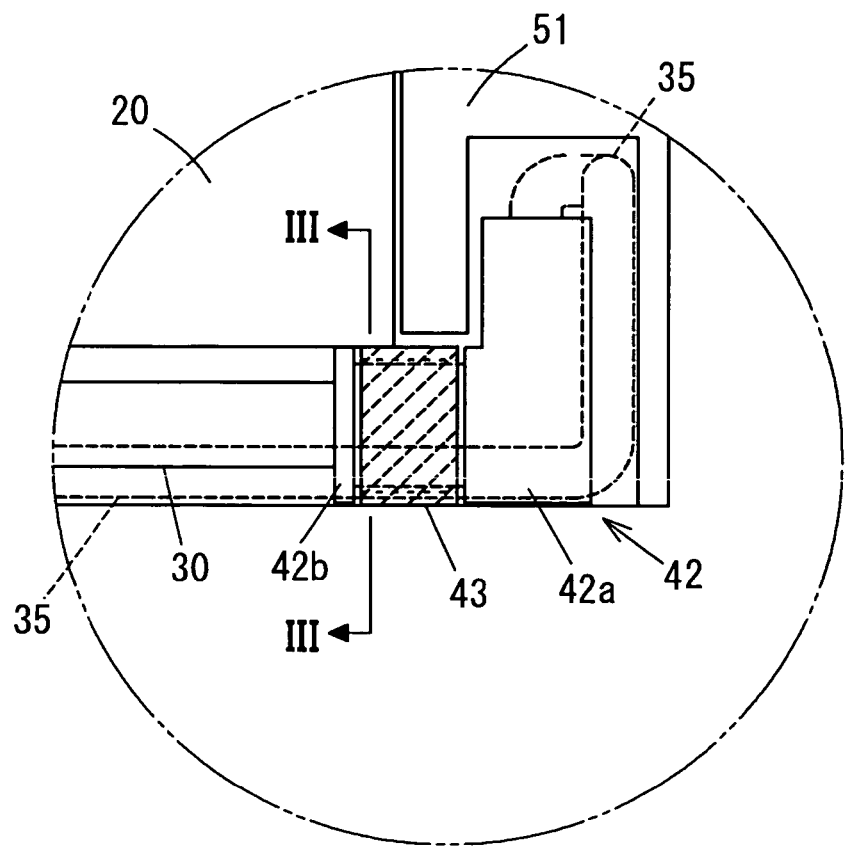
Figure 2B:
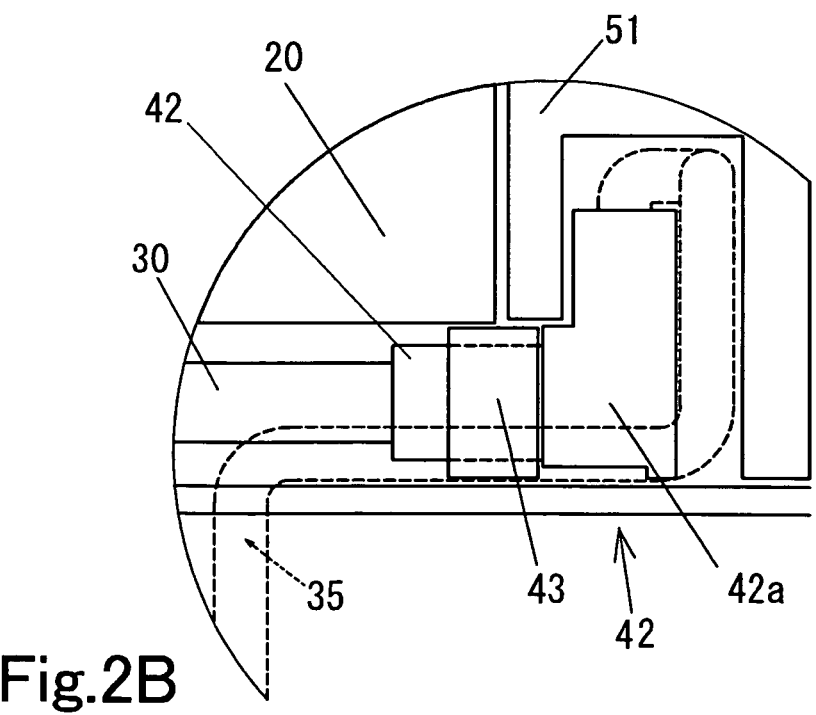
FIG. 2B is a plane view of the principal portion of a modified example of the FIG. 1 embodiment of the present invention.
Figure 3:
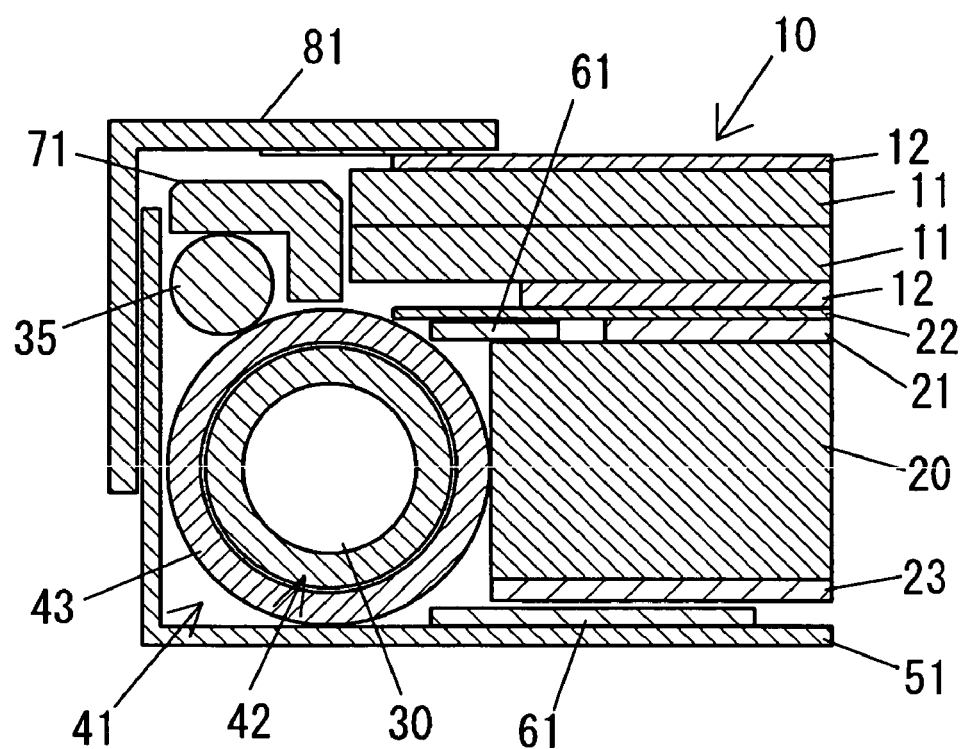
FIG. 3 is a cross-sectional view of the principal portion of the liquid crystal module representing the FIG. 1 embodiment of the present invention.
Figure 4:
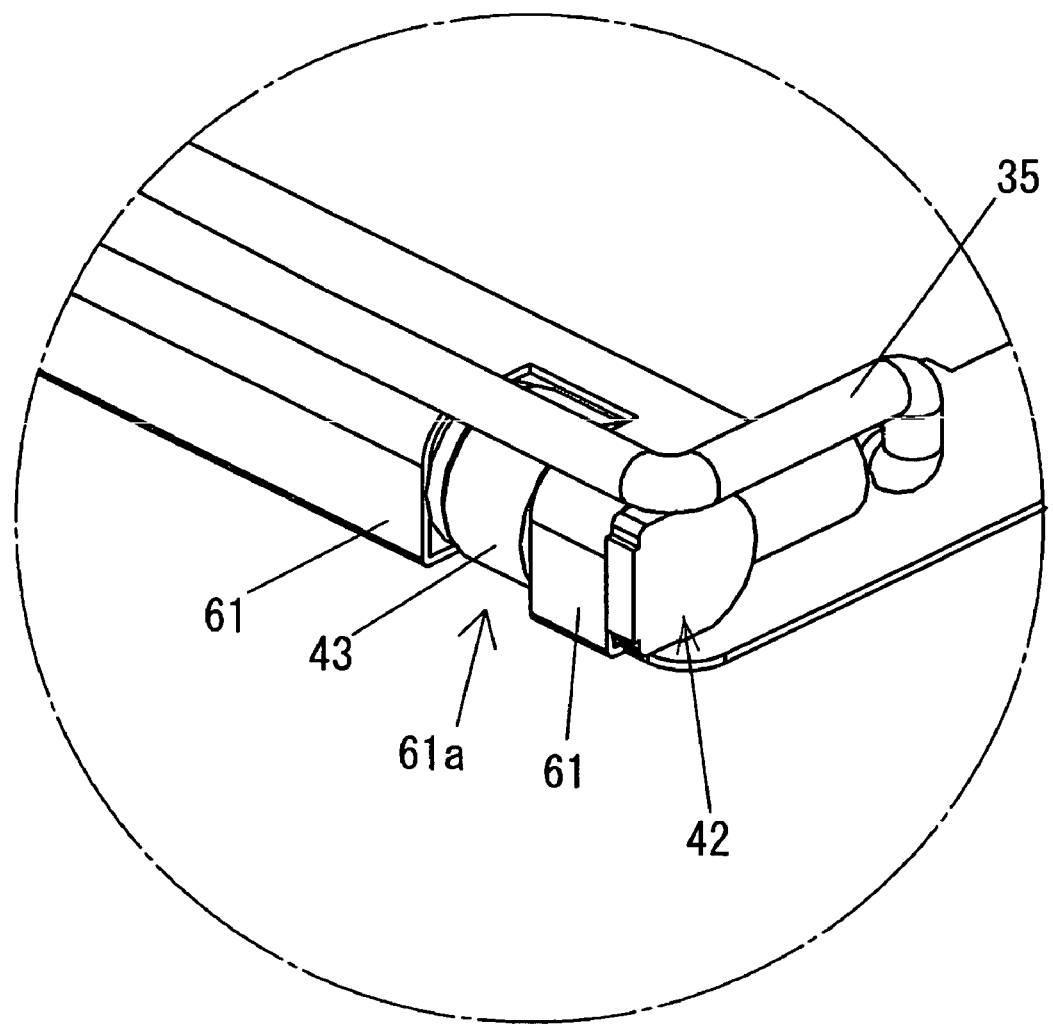
FIG. 4 is a perspective view of the principal portion of the liquid crystal module representing the FIG. 1 embodiment of the present invention.

FIG. 1 is the front view of a liquid crystal module 1 provided with a sidelight-type backlight. FIG. 2A is the enlarged plane view of the IIA portion illustrated in FIG. 1, while FIG. 2B is a modified illustration of FIG. 2A. FIG. 3 is the cross-sectional view of the line III-III in the enlarged plane view of FIG. 2A. FIG. 4 is the perspective view of FIG. 2A. FIGS. 5A to 5G are the perspective views of various modified examples of the lamp holder. Note that constituent members of the lamp holder are similar to those illustrated in FIG. 6, showing the conventional example, and have been marked with the same reference numerals, although not all of the constituent members appear in each drawing.

The liquid crystal module 1 comprises a liquid crystal panel 10 made of acrylic resin and a sidelight-type backlight.

As shown in FIG. 3, a front frame 81 made of metal, with an opening corresponding to the display area of the liquid crystal panel 10, is arranged on the front side of the liquid crystal panel 10 so as to cover the periphery thereof. The liquid crystal panel 10 essentially comprises a pair of transparent substrates 11 made of glass or the like, a liquid crystal layer (not shown) formed between the two transparent substrates, and polarizers 12 that are adhered to the surface of each such substrate. The liquid crystal layer does not face the substrates.

The sidelight-type backlight essentially comprises a light guide 20 positioned on the rear surface of the liquid crystal panel 10, a linear light source 30 positioned on the side surface of the light guide 20, and lamp holders 41 attached on both ends of the linear light source.

The light guide 20 is rectangular in shape corresponding to the shape of the liquid crystal panel 10, and the bottom surface thereof is flecked with reflective paint or the like. The light guide 20 emits light from the linear light source 30, which is made incident to the side surface of the light guide 20 toward the liquid crystal panel 10. The side of the light guide 20 facing the linear light source 30 is not provided with a notch, protrusion, or the like near the corners to fasten it, as unevenness occurs when light travels in that area, such that abnormal light is easily generated.

Optical sheets comprising the diffusion sheet 21 and the prism sheet 22 are arranged between the liquid crystal panel 10 and the light guide 20, when necessary. Further, the reflector 23 is arranged on the rear surface of the light guide 20. The reflector 23 reflects light, that has been made incident to the light guide 20, toward the liquid crystal panel 10. Note that the reflector 23 may be arranged not only on the rear surface of the light guide 20 but also on the side surface thereof where the linear light source 30 is not positioned. Additionally, the light guide may be integrally formed with a lamp house 61 (described later).

The linear light source 30 arranged on the side of the light guide 20 is a cold cathode tube that is often used as the light source for the backlight of a liquid crystal module, such as a glass tube having a diameter of about 1.8 mm with fluorescent material film formed on the inner surface thereof and with rare gas enclosed therein. Further, electrodes are installed and sealed inside both ends of the glass tube, with lead wires 35 being connected to the electrodes and extending outwardly to the outside of the glass tube. The length of the linear light source 30 is longer than that of the light guide 20.

The lamp holders 41 cover the ends of the linear light source 30 and a portion of the lead wires 35 extending from the linear light source 30, and are flat and L-shaped to fit the corners of the rectangular light guide 20. Further, the cross-section of a portion of the lamp holders 41 covering the linear light source 30 is circular in shape similar to the external shape of the linear light source 30 such that any stress is applied evenly, while that portion covering the lead wires 35 is vertically planar to stabilize the lamp holders 41.

The major part of the lamp holder 41 comprises an elastic member 42 of insulated and elastically deformed silicon rubber material, which facilitates the attachment of the linear light source 30 to the case 51, allows the linear light source 30 itself to be stably supported or affixed inside the case 51, and absorbs vibration and impacts which are directly applied to the linear light source 30, thereby preventing damage or the like to the linear light source 30.

The ring-shaped hard member 43, made of a material harder than the elastic member 42, is provided on a part of the lamp holder 41. As shown in FIG. 2A, a recess is formed on a part of the elastic member 42, in which the plane along the circumference of the linear light source 30 is concave in shape, (specifically in the area between the portions marked as 42a and 42b in the plane view of FIG. 2A) at the point where the light guide 20 and the lamp holder 41 overlap, and the hard member 43 is engaged with the recess. At the recess portion, the elastic member 42 is about 0.4 mm thick with an outer diameter of 2.6 mm. Further, the inner diameter and the outer diameter of the ring-shaped hard member 43 are 2.7 mm and 3.0 mm to 3.5 mm respectively. A slight gap is formed between the elastic member 42 and the ring-shaped hard member 43. Note that the elastic member 42b, acting as a wall for the recess, which is positioned at the end portion of the elastic member 42, may be omitted, and one side of the elastic member 42 facing the other lamp holder can be simply a small diameter portion, as shown in FIG. 2B. In this case, the ring-shaped hard member 43 is simply engaged with the elastic member 42. However, even under such condition, if the outer diameter of the elastic member 42 is slightly larger than the inner diameter of the ring-shaped hard member 43, the ring-shaped hard member 43 will not come off easily by vibration or the like due to the elastic force of the elastic member 42.

As above-described, by providing the ring-shaped hard member 43 on a portion of the lamp holder 41 at the point where the light guide 20 and the lamp holder 41 come into contact with each other, the ring-shaped hard member 43 becomes a grip for the lamp holder and damage to the linear light source 30 can be prevented even if a large impact is applied to the liquid crystal module 1 to make the light guide 20 come into contact with the linear light source 30, or even if an impact is transmitted via the lamp holder 41 without contact taking place. Furthermore, since the hard member 43 is ring shaped, it can prevent the linear light source 30 from being damaged due to an impact when the case 51 is hit from the side or from above. Moreover, as shown in FIG. 3, because it is ring shaped, space can be formed between the hard member 43 and the case 51, so as to allow the lead wire 35 to be routed through the space, thereby effectively utilizing the space. Particularly in the case where the gap between the light guide 20 and the case 51 is narrow, the lead wire can be easily inserted into the narrow space, thereby facilitating assembly. This is not possible when the hard member 43 is cubic in form, such that the insertion direction of the holder is already fully determined, adversely affecting assembly workability.

Note that a part of the ring-shaped hard member 43 comes into contact with the side surface of the light guide 20 in the plane view. Further, even if the ring-shaped hard member 43 is not in direct contact with the side surface of the light guide 20, it is sufficient that the ring-shaped hard member 43 can block the impact transmitted to the linear light source 30 via the elastic member 42. Therefore, the ring-shaped hard member may be embedded inside the elastic member 42. Further, even if the position of the ring-shaped hard member 43 is shifted from the position shown in FIGS. 2A and 2B to the right-hand side (in the Drawings) and it does not make contact with the light guide 20, the presence of the ring-shaped hard member 43 in the lamp holder 41 can protect the linear light source 30 against an impact transmitted via members around the lamp holder 41. Consequently, each member can be rigorously arranged and a space-saving liquid crystal module can be provided.

Furthermore, it is recommended that the hard member 43 be constituted with a perfect ring shape, the reason being that although the linear light source 30 is easily attached to the lamp holder 41 when a part of the ring is missing (which is therefore preferable), elasticity occurring in the ring may cause the shape of the hard member 43 to be deformed during shock absorption, thereby causing the linear light source 30 to be broken. This is particularly true when the lamp holders 41 are arranged in a very narrow area, such that the possibility of breaking the linear light source 30 is larger if the ring were to be used with a part thereof missing. As mentioned earlier, when the hard member 43 is in perfect ring shape, it can be attached easily and the linear light source 30 can be protected evenly against an impact that may be applied to it from any direction along the contour of the hard member 43.

In the embodiment of FIG. 1, the ring-shaped hard member 43 is preferably made of a material harder than that of the elastic member 42, such as steel or stainless steel. This is because the ring-shaped hard member 43 made of metal is considerably more rigid than a member formed of resin such as plastic, for example. In addition, to obtain the degree of rigidity of the ring-shaped hard member 43 made of metal, the hard member 43 made of resin causes the member to become larger, which therefore makes it unsuitable for the purpose of space saving. Further, since the metal ring-shaped hard member 43 has relatively good thermal conductivity, heat around the electrodes of the linear light source 30 can be effectively released. Note that nitride processing or the like may be applied to the metal surface, for example, to increase the rigidity of the ring-shaped hard member 43.

Furthermore, in the embodiment of FIG. 1, the ring-shaped hard member 43 is engaged with a portion of the elastic member 42 where the concave recess is formed. Specifically, the ring-shaped hard member 43 is not engaged with the recess of the elastic member 42 at the point where the end portion of the lamp holder 41 is formed (in other words, the case of the elastic member 42a only), but is engaged with the recess where the elastic members 42a and 42b are positioned on both sides of the ring-shaped hard member 43. This is because the distance from the connection area between the electrodes of the linear light source 30 and the lead wires 35 to the metal hard member 43 along the surface of the elastic member 42, which is a creepage distance for insulation, becomes proportionately longer in relation to the presence of the elastic member 42a and is effective for achieving electric insulation. Further still, the ring-shaped hard member 43 will not be easily dislodged from the recess with which it is engaged in contrast to the case where the elastic member 42b is not included.

The lamp house 61 whose cross-section is horseshoe-shaped is arranged along the longitudinal direction of the linear light source 30 to which the lamp holders 41 are attached such that the lamp house covers the linear light source 30 and the lamp holders 41. The lamp house 61 allows the light emitted from the linear light source 30 to efficiently strike the side surface of the light guide 20. The lamp house 61 is an insulative white sheet or the like, whose upper end is affixed to the top surface of the light guide 20 by adhesive tape or the like. Further, the lower end of the lamp house is arranged between the light guide 20 and the case 51.

In the embodiment of FIG. 1, openings 61a are provided at certain areas of the lamp house 61, where the ring-shaped hard member 43 of the lamp holders 41 and the lamp house 61 overlap, and the ring-shaped hard member 43 is exposed. By providing the openings 61a at certain positions of the lamp house 61 (see FIG. 4), which correspond to the ring-shaped hard member 43 of the lamp holders 41, further space saving can be realized and any impact transmitted to the ring-shaped hard member 43 can be prevented from being directly transmitted to the lamp house 61. Thus, misalignment or the like of the lamp house 61 will hardly occur and assembly is made easier, while at the same time, the incidence of light to the light guide 20 is significantly stabilized.

The case 51, which may be made of resin or metal, serves as housing for the light guide 20, the linear light source 30, the lamp holders 41, the lamp house 61, and the optical sheets comprising the diffusion sheet 21 and the prism sheet 22. Additionally, the case 51 may be constituted by one member or by a plurality of members. By engaging the case 51 with the front frame 81, the liquid crystal panel 10 and the sidelight-type backlight are integrally fixed. In this embodiment, nails or the like for affixing the light guide 20 to the bottom surface or the like of the case 51 are not provided, and the bottom surface of the case 51 is relatively flat around the space between the light guide 20 and the lamp holders 41. Specifically, the light guide 20 is positioned close to the side surface of the case 51, with which the light guide comes into contact, and the lamp holders 41 that press against the side surface of the light guide 20. This eliminates additional processing of the case 51, as well as the generation of abnormal light caused by the fixing nails.

An inner frame 71 is arranged along the four sides of the case 51, which supports and affixes the liquid crystal panel 10 and is also used for affixing the optical sheet. The inner frame 71 is also used for holding the lamp house 61 on the linear light source 30. The inner frame 71 may be constituted by one member or by a plurality of members. Space saving can be achieved when the lead wires 35, that are led out from the lamp holders 41 at both ends, are housed in the space created between the case 51, the lamp house 61, and the inner frame 71. Then, the lead wires 35 are led to an area outside where the lead wires 35 extending from both ends of the linear light source 30 meet via an opening provided on the side surface of the case 51, and are connected to an inverter circuit board (not shown) via a connector.

Note the examples mentioned in the above embodiment where the elastic member 42b of the lamp holder 41 was provided with a ring shape (FIG. 2A) and where the elastic member 42b was removed (FIG. 2B). However, the desired effect of preventing the hard member 43 from being dislodged or coming off is obtained when the shape of the elastic member 42b is a small protrusion only in one area, similar to the case where the member 42b was provided with a ring shape. Modified examples of the elastic member 42 are shown in FIGS. 5A to 5G.

Figure 5A:
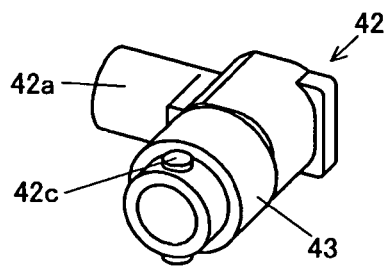
FIGS. 5A to 5G are perspective views of modified examples of a lamp holder of the FIG. 1 embodiment of the present invention.
Figure 5B:
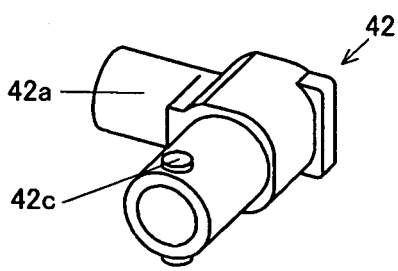
Figure 6:
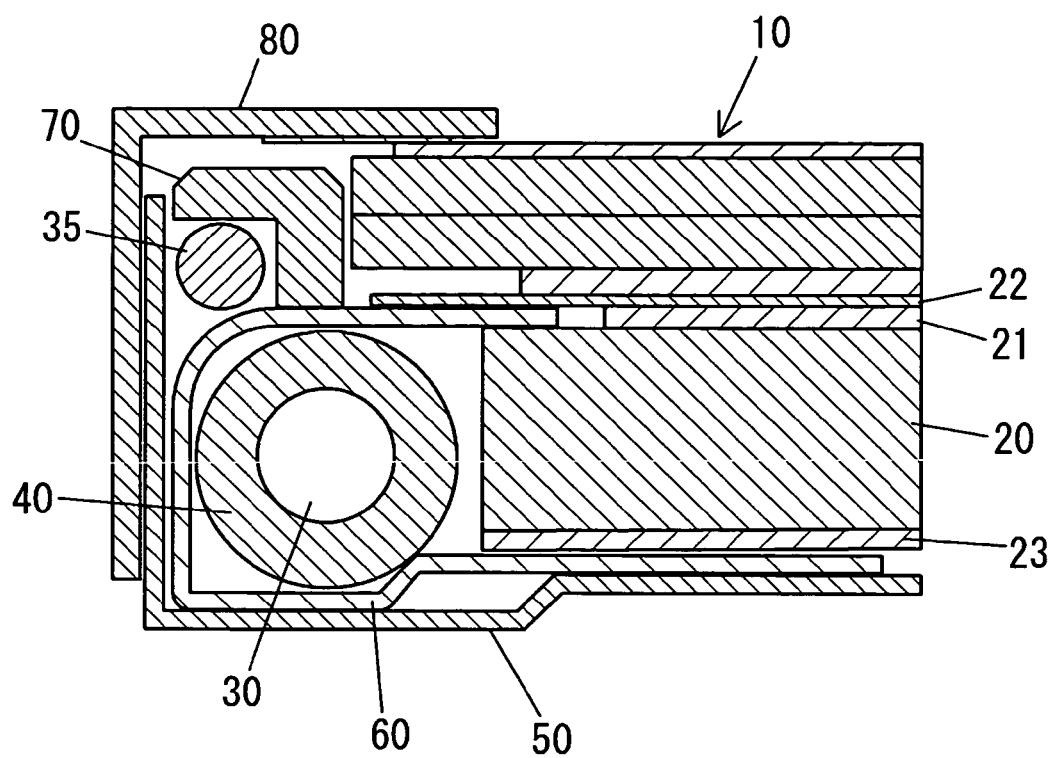
FIG. 6 is an enlarged cross-sectional view of the principal portion of a conventional liquid crystal module.

FIG. 5A is a perspective view of the elastic member 42 in which two small disc-shaped protrusions 42c are provided on a part of its end portion and the ring-shaped hard member 43 is attached to it, and FIG. 5B is a perspective view of the elastic member 42 where the ring-shaped hard member 43 is removed.

Figure 5C:
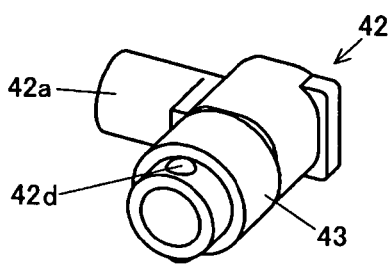
Figure 5D:
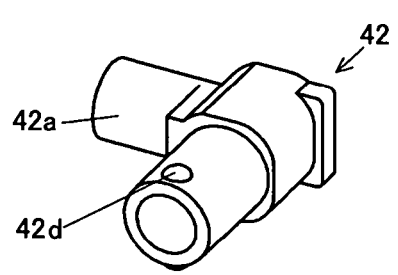
Figure 5E:
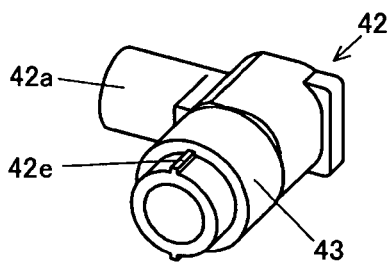
Figure 5F:
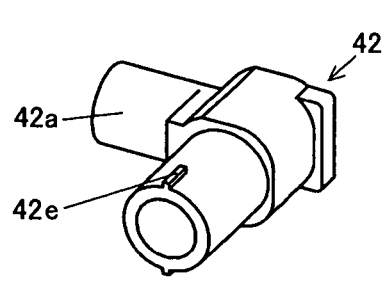
Figure 5G:
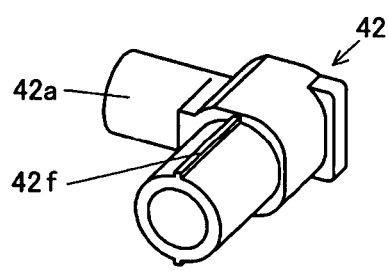

Further, other than the small disc-shaped small protrusions 42c, the protrusions can take various forms. For example, FIGS. 5C and 5D show an example where two small hemispherical-shaped protrusions 42d are provided on the end portion of the elastic member 42. FIG. 5C is a perspective view of the elastic member 42 where the ring-shaped hard member 43 is attached to the elastic member 42, and FIG. 5D is a perspective view where the ring-shaped hard member 43 is removed. Similarly, FIGS. 5E to 5G show examples where small rib-shaped protrusions 42e and 42f, extending in the longitudinal direction, are formed on the end portion of the elastic member 42. FIG. 5E is the perspective view of the elastic member 42 where the ring-shaped hard member 43 is attached to the elastic member 42, and FIGS. 5F and 5G represent perspective views where the ring-shaped hard member 43 is removed. In this case, the rib-shaped protrusions 42e and 42f may be of such length so as not to come into contact with the inner surface of the elastic member 42, as shown in FIG. 5F, or be of a length in which the rib contacts the inner surface, as shown in FIG. 5G.

In each of the cases shown in FIGS. 5A to 5G, the small protrusions 42c to 42f are easily altered when the ring-shaped hard member 43 is fitted to the elastic member 42, so that the latter easily fits. Additionally, after the hard members 43 are fitted, the protrusions 42c to 42f work as a stopper, greatly reducing the possibility that the ring-shaped hard member 43 will be realigned due to vibration or the like. Particularly, in the case of the rib-shaped protrusions 42e and 42f of FIGS. 5E to 5G, since the rib-shaped protrusions 42e and 42f are bent when the ring-shaped hard member 43 is fitted, the hard member 43 can be easily inserted.

Note that the present invention is not limited to the above-described embodiments, as the invention can be applied to a sidelight-type liquid crystal module where the lamp holders are attached on both ends of the linear light source. Further, the linear light source is not limited to a linear light source of a straight-line form but may either be L-shaped or U-shaped. Further still, the lamp holders need not necessarily support or affix only one linear light source, but may be such as would support or affix a plurality of linear light sources arranged on the side of the light guide.

According to the described embodiments, since the lamp holders attached to both ends of the linear light source are formed by an elastic member and a ring-shaped hard member in a liquid crystal module provided with the sidelight-type backlight, damage to the light source wrought by an impact may be prevented without affecting the light emitted to the liquid crystal panel, even if the gap between the linear light source and the light guide is extremely small in order to realize space saving.

What is claimed is:

1. A liquid crystal module, comprising:
   a liquid crystal panel;
   a light guide;
   a linear light source disposed at a side of the light guide;
   a plurality of lamp holders each comprising an elastic material, the lamp holders being respectively attached on both ends of the linear light source;
   a case for housing said light guide, said linear light source, and said lamp holders; and
   a ring-shaped hard member, configured to fix the distance between said light guide and said case, attached to each said lamp holder, each said ring-shaped hard member being engaged in a recess formed in each of said lamp holders along the circumference of said linear light source, wherein the recess is defined by elastic members positioned on both sides of said ring-shaped hard member.

2. The liquid crystal module according to claim 1, wherein said light guide comprises a rectangular shape, and wherein the bottom surface of said case is relatively flat in a space between said light guide and said lamp holders.

3. The liquid crystal module according to claim 1, wherein said ring-shaped hard member comprises metal.

* * * * *